US012275161B2

(12) United States Patent
Zogg et al.

(10) Patent No.: US 12,275,161 B2
(45) Date of Patent: Apr. 15, 2025

(54) SYSTEM, METHOD AND FLANGE DEVICE FOR FASTENING A SAW BLADE TO A DRIVE SPINDLE OF A SAWING DEVICE

(71) Applicant: Hilti Aktiengesellschaft, Schaan (LI)

(72) Inventors: Urs Zogg, Grabs (CH); Josef Schittl, Thueringen (AT); Bruno Werder, Gamprin (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/025,760

(22) PCT Filed: Sep. 9, 2021

(86) PCT No.: PCT/EP2021/074768
§ 371 (c)(1),
(2) Date: Mar. 10, 2023

(87) PCT Pub. No.: WO2022/063587
PCT Pub. Date: Mar. 31, 2022

(65) Prior Publication Data

US 2023/0347545 A1 Nov. 2, 2023

(30) Foreign Application Priority Data

Sep. 22, 2020 (EP) .................................... 20197329

(51) Int. Cl.
*B27B 5/32* (2006.01)

(52) U.S. Cl.
CPC .................................... *B27B 5/32* (2013.01)

(58) Field of Classification Search
CPC .. B23B 5/32; B23B 31/00; B27B 5/29; B27B 5/30
See application file for complete search history.

(56) References Cited

U.S. PATENT DOCUMENTS 6,813,984 B1 11/2004 Johnson et al.
11,305,452 B1 * 4/2022 Chang ....................... B27B 5/36
(Continued)

FOREIGN PATENT DOCUMENTS

EP 1990146 A2 11/2008
EP 3501766 A1 6/2019
WO WO 9012222 10/1990

OTHER PUBLICATIONS

International Search Report of PCT/EP2021/074768 dated Dec. 3, 2021.

*Primary Examiner* — Sarang Afzali
*Assistant Examiner* — Darrell C Ford
(74) *Attorney, Agent, or Firm* — Davidson Kappel LLC

(57) ABSTRACT

A flange device and to a method for fastening a saw blade to a drive spindle of a sawing device. Among other things, the flange device includes a nut, which is arranged in a movable manner in an interior of a flange body, wherein, in a closed state of the flange device, the nut surrounds a central screwing device, which is guided in the drive spindle, for the purpose of fastening. A system for fastening a saw blade to a drive spindle of a sawing device, wherein the system has a flange device, and a sawing device and a central screwing device. The drive spindle of the sawing device can be pressed in the direction of the flange device by a spring, such that, in the closed state, it can be received by an interior of the nut of the flange device.

20 Claims, 13 Drawing Sheets

(56) References Cited

U.S. PATENT DOCUMENTS

| | | | | |
|---|---|---|---|---|
| 2002/0174913 | A1* | 11/2002 | Johansson | B27B 5/34 144/371 |
| 2006/0201492 | A1 | 9/2006 | Baratta et al. | |
| 2017/0095867 | A1* | 4/2017 | Hsu | B23D 47/02 |
| 2020/0376704 | A1 | 12/2020 | Schittl et al. | |

* cited by examiner

SYSTEM, METHOD AND FLANGE DEVICE FOR FASTENING A SAW BLADE TO A DRIVE SPINDLE OF A SAWING DEVICE

The present invention relates to a flange device and to a method for fastening a saw blade to a drive spindle of a sawing device.

BACKGROUND OF THE INVENTION

Sawing devices, for example wall saws, with which cuts can be introduced into a substrate or a wall, are known from the prior art. Sawing devices usually have, as a tool, a saw blade which executes a rotary movement and as a result introduces the cut into the substrate or into the wall to be worked. The saw blade is fastened on the drive spindle of the sawing device by means of a saw blade flange or a flange device.

SUMMARY OF THE INVENTION

A drawback of existing solutions for these saw blade flanges is that they frequently have a large number of moving parts, and so assembly and changing the saw blade are very complicated and time-consuming. Furthermore, the large number of small parts can easily be lost, in particular when the sawing device is used on a construction site, and this can result in further delays. In particular when special connecting means, such as special screws, are used in order to fasten the saw blade, problems can arise when specifically these special screws are lost and a replacement is potentially not readily available.

Furthermore, the components of many flange devices known from the prior art are easily soiled and so stable, secure and robust fastening of the saw blade to the drive spindle is not always ensured.

Those skilled in the art would welcome it if a flange device could be provided that allows the saw blade to be pre-centered. This is because the finding and alignment of the threaded bore has to be carried out very carefully, especially when mounting saw blades with large diameters. For this purpose, trained, experienced personnel is necessary, as is a special tool, in particular for finding the threaded bore. If the saw blade is not aligned properly, undesired, rapid wearing of the thread can disadvantageously occur.

It is an object of the invention to provide a flange device for a sawing device, which overcomes the deficiencies and drawbacks of the prior art and with which a saw blade can be fastened to the drive spindle of a sawing device without tools and in an uncomplicated and time-saving manner. A further object of the invention is for the connection between the flange device and saw blade to be resistant to soiling and stable, robust and secure. In order to reduce the risk of parts being lost during the mounting or changing of saw blades, it would be desirable for the flange device to be provided to comprise as few parts as possible.

In a first aspect the present invention provides a flange device for fastening a saw blade to a drive spindle of a sawing device, wherein the flange device has a centering ring, a nut and a flange body. The flange device is characterized in that the flange body forms an outer region of the flange device, wherein the nut is arranged in a movable manner in an interior of the flange body, wherein the centering ring is fastened to the flange body by fastening means, and wherein, in a closed state of the flange device, the nut surrounds a central screwing device, which is guided in the drive spindle, for the purpose of fastening. According to the invention, the central screwing device can preferably be referred to as a fastening screw.

In a second aspect, the invention relates to a system for fastening a saw blade to a drive spindle of a sawing device, wherein the system has a flange device, and a sawing device and a central screwing device.

As a result of the use of the flange device, it is advantageously possible to dispense with the use of tools or fastening means, such as special screws, to be specially kept in store. In particular, the saw blade can be fastened to the sawing device manually, this being associated with the advantage that manual fastening frequently takes place in a more “tactile” manner, and so the risk of mechanical damage to the constituents of the flange device and of the sawing device is reduced. Tests have shown that the constituents of the flange device can be cleaned particularly readily. Furthermore, the flange device consists of relatively few parts, and so it can be assembled particularly easily. In particular, the personnel used for this purpose does not have to have extensive training. A further advantage of the invention is that the nut is provided as a movable part in the flange device because, as a result, it is easier to clean and service the system.

According to the invention, it is preferred that the sawing device is a wall saw. When wall saws are used, the application arises whereby a flush cut is intended to be carried out, in which there is no space for the fastening of the saw blade between the saw blade and the substrate to be worked. The flange device is intended to be able to be used especially in this application. In this regard, it can preferably also be referred to as or represent a flush-cut flange.

The sawing device, which is preferably also referred to as a “saw” according to the invention, is preferably designed to introduce cuts into walls and substrates. To this end, the cut is created with a saw blade as tool, wherein the saw blade preferably executes a rotary movement about an axis of rotation. The axis of rotation preferably coincides with a virtual central axis of a drive spindle of the saw, which is driven by the motor of the saw and transmits a rotary movement to the saw blade.

The saw blade is preferably a constituent of a saw head of the sawing device, wherein the saw blade is preferably fastened to a saw arm and is driven about an axis of rotation by a drive motor. The saw arm is designed to be pivotable and can be adjusted about a pivot axis by a pivoting motor. Sawing devices, in particular wall saws, can furthermore cooperate with a motorized feed unit and a guide carriage. The motorized feed unit preferably has a feed motor, wherein the saw head is arranged on the guide carriage and can be moved along the guide rail via the feed motor. The saw blade is driven about the axis of rotation via a drive motor, a drive spindle and a transmission device which connects the drive spindle to the drive motor in a torque-transmitting manner.

According to the invention, it is preferred that the saw blade is fastened to the drive spindle by means of the flange device. The flange device comprises a centering ring, a nut and a flange body, wherein the flange body and saw blade are connected together. The centering ring and the flange body are connected together via a screw connection. Radially arranged securing screws are provided at the circumference of the centering ring and can be screwed into corresponding radial bores having an internal thread in the flange body. The saw blade can preferably be fastened to the flange body by fastening screws that are arranged at the circumference of the flange body. The flange body is preferably also connected to the drive spindle of the sawing device, and so, when the saw blade is fastened to the flange body of the flange device, the saw blade is carried along when the drive spindle rotates. As a result, the saw blade can be driven to perform the rotary movements, allowing the substrate to be worked.

In a further aspect, the invention relates to a method for fastening a saw blade to a drive spindle of a sawing device, wherein the method comprises the following steps:

a) providing a sawing device having a drive spindle,
b) providing a central screwing device,
c) providing a flange device, wherein, in an open state, which is the starting point for the fastening method, a nut of the flange device is received substantially entirely in an interior of a flange body of the flange device and the central screwing device is arranged substantially entirely inside the drive spindle,
d) introducing the central screwing device into an internal thread of the nut, with the result that a driver and the nut of the flange device come into engagement,
e) continuing to screw the central screwing device into the internal thread of the nut,
f) continuing to screw the central screwing device into the internal thread of the nut, with the result that the nut of the flange device is drawn onto the central screwing device.

According to the invention, it is preferred that the driver in the sawing device has cams on its end face, which can come into engagement with pockets on the rear side of the nut of the flange device. This occurs preferably in response to the introduction of the central screwing device into an internal thread of the nut. The fastening screw is preferably screwed further into the internal thread of the nut of the flange device. As a result, a sleeve within the saw can be introduced into a gap between the driver and the central screwing device, and a first spring can be compressed. If the fastening screw is screwed even further into the nut, the nut is drawn rearwardly out of the interior of the flange body of the flange device. As a result, the nut is drawn onto the fastening screw. In other words, the fastening screw and the nut are tightened, wherein this tightening is supported by the sleeve, the stops and the first spring. According to the invention, it is preferred that the nut is drawn out of the interior of a flange body until a fastened state between the flange and saw is established in that a stop is reached and an external thread of the central screwing device has been received substantially entirely in the nut of the flange device. In other words, in this way, a screwed connection is established between the nut of the flange device and the fastening screw. The saw blade can be screwed onto a front side of the flange and thus be fastened to the flange and to the sawing device. In this way, with the present method, a possible way of fastening a saw blade on a sawing device using a flange device can be provided. The definitions, technical effects and advantages that have been described for the flange device and the system apply analogously to the present fastening method, and vice versa.

In a preferred embodiment, the invention comprises the following method steps:

a) providing a sawing device having a drive spindle,
b) providing a central screwing device,
c) providing a flange device, wherein, in an open state, which is the starting point for the fastening method, a nut of the flange device is received substantially entirely in an interior of a flange body of the flange device and the central screwing device is arranged substantially entirely inside the drive spindle,
d) introducing the central screwing device into an internal thread of the nut, with the result that cams on the end face of a driver come into engagement with cutouts on the rear side of the nut,
e) continuing to screw the central screwing device into the internal thread of the nut, with the result that a sleeve is introduced into a gap between the driver and the central screwing device, and a first spring is compressed,
f) continuing to screw the central screwing device into the internal thread of the nut, with the result that the nut is drawn out of the interior of a flange body until a closed state is reached in that a stop is reached and an external thread of the central screwing device has been received substantially entirely in the nut of the flange device.

According to the invention, it is preferred that, in this closed state, the sleeve is received substantially entirely in a gap that is formed between the central screwing device and the driver, and the first spring is in a loaded state. The closed state corresponds preferably to the state in which the saw blade can be fastened to the sawing device by means of the flange. Therefore, according to the invention, it is also referred to as the fastened state.

According to the invention, it is preferred that the nut of the flange device cooperates with the fastening screw in order to establish a connection. In order to mount the flange device on the sawing device, first of all the flange device is brought into the vicinity of the drive spindle of the sawing device. In this case, the nut is in a state retracted entirely into the interior of the flange body and a gap is formed between the nut and the fastening screw. The central screwing device is preferably likewise configured in a movable manner and can be moved in a lateral direction in an interior that is formed by the drive spindle. In other words, the fastening device can be moved forward (in the direction of the flange device) and rearward (in the direction away from the flange device). The fastening screw comprises, at its rear end, a screw head, which forms a stop, as far as which the screw can travel into the interior of the drive spindle. In the non-fastened, i.e., according to the invention, "open", state, the fastening screw is in a state not fully retracted into the interior of the fastening screw.

In a next step, the screw is moved in the direction of the flange device. Preferably, the fastening screw travels into the nut of the flange device. According to the invention, it is also preferred that the screw is screwed—for example in about 2 revolutions—into the internal thread of the nut. This brings about first, loose fastening of the fastening screw within the nut. The screw is surrounded by a driver, which, in this step of the fastening method, moves forward with the screw in the direction of the flange device. On an end face, the driver comprises cams, i.e. protuberances, which can cooperate with pockets on the rear side of the nut. Preferably, the rear side of the nut is oriented in the direction of the sawing device during fastening. The rear side of the nut can comprise for example five pockets, wherein any other number of pockets or cutouts can also be provided, which can be distributed around the circumference of the nut. It is also possible, for example, for 1, 2, 3, 4, 5, 6, 7, 8, 9 or 10 pockets to be arranged on the circumference of the rear side of the nut, in order to cooperate with the cams on the end face of the driver. The end face of the driver is preferably oriented in the direction of the flange device. According to the invention, it is preferred that a number of the cams of the driver corresponds to a number of the pockets on the rear side of the nut. The cutouts or pockets preferably have inclined planes, by means of which the cams can slip particularly easily into the pockets. When the cams are located in the pockets, they support the connection between the sawing device and flange device. According to the invention, it is particularly preferred that the cams and the pockets with which the cams interact are designed to block any relative movement of the drive spindle of the saw.

Located between the driver and the fastening screw is an annular gap or a cylindrical cavity. Into this gap or cavity, it is possible for a sleeve to penetrate, which surrounds the fastening screw and which is connected to the fastening screw via a thread. At the start of the mounting operation, when the screw is drawn out of the drive spindle to its maximum extent, there is more or less no overlap between the driver and the sleeve. However, the driver and the sleeve overlap in a stop region. In this stop region, a protruding element in the rear region of the driver engages in a snap-connection device of the sleeve, resulting in a connection between the driver and sleeve. The snap-connection device is preferably located in a front region of the sleeve, such that the driver and the sleeve exhibit a minimum overlap as a result of the arrangement of the protruding element and the snap-connection device at the start of the fastening or mounting operation, wherein the overlap is preferably formed by the stop region between the driver and the sleeve. As a result of the snap connection between the driver and sleeve, the fastening screw is prevented from being drawn further out of the drive spindle. During the fastening operation, or during the mounting operation, the fastening screw, which is connected to the sleeve, is screwed further into the nut, i.e. the screw is pushed further "forward" in the direction of the flange device. On account of the connection between the screw and sleeve, the sleeve also carries out this movement, wherein the sleeve is, in particular, pushed into the interior between the screw and driver until the sleeve is arranged almost entirely—apart from a rear region of the sleeve—in the cavity or the gap between the driver and fastening screw. In other words, the sleeve is received almost entirely by the driver, or the interior thereof. According to the invention, it is preferred that the sleeve can be pressed in and/or adhesively bonded in.

The sleeve is preferably surrounded by a spring, wherein, according to the invention, the spring is preferably referred to as "first spring". The spring is spaced apart from the sleeve to such an extent that the spring also surrounds the driver when the sleeve is pushed into the driver during the fastening or mounting method. In other words, the inside diameter of the first spring is greater than an outside diameter of a rear region of the driver, such that the first spring surrounds this rear region of the driver at the end of the mounting method, when the flange device is fastened to the drive spindle, or to the sawing device. According to the invention, it is preferred that the first spring is in an unloaded state at the start of the mounting method, while it is compressed or telescopes during the mounting of the flange device. At the end of the mounting method, when the flange device is fastened to the sawing device, it is in a loaded or tense state, in which it is preferably configured to store a certain amount of spring or tensile energy. The spring telescopes, in particular, toward the front from the rear region of the sleeve and is thus loaded.

This telescoping of the first spring takes place preferably in conjunction with the screwing of the fastening screw into the nut of the flange device. Since the nut is designed to be movable in a lateral direction within the flange body of the flange device, the nut travels rearwardly in the hollow interior of the flange body and thus-revolution by revolution-leaves the interior of the flange device. At the end of the mounting method, approximately half of the nut has left the interior of the flange body of the flange device. It is prevented from leaving any further by a stop which is formed between protruding elements of the nut and of the flange body. According to the invention, it is preferred that the stop is present in the vicinity of the drive spindle.

According to the invention, it is preferred that the nut, the fastening screw, the driver, the first spring and the sleeve are compressed or screwed together by the fastening or mounting method. Tests have shown that a particularly stable, secure and easy-to-clean possibility for fastening a flange or a saw blade to a sawing device or the drive spindle thereof can be provided by the present method with the present flange device and the sawing system.

According to the invention, it is preferred that the flange device can be in a closed state and in an open state. Preferably, in the closed state, the saw blade can be fastened to the flange device, while, in the open state of the flange device, the saw blade is preferably separated from the flange device.

In the context of the present invention, the fastening screw is arranged in a movable manner in the saw. It can, in particular, be pressed in the direction of the flange device counter to a spring, which is referred to as "second spring" according to the invention. As a result, a front region of the fastening screw protrudes, in the closed state, out of the sawing device by a length l, wherein this part that protrudes from the saw is received by the internal thread of the nut of the flange device. This preferably means, according to the invention, that a front region of the fastening screw does not terminate flush with the front or receiving side of the sawing device, but projects beyond this front side or protrudes therefrom. According to the invention, it is preferred that the face of the sawing device that is in contact with the flange device during fastening is referred to as the "front or receiving side of the sawing device". Preferably, the front or receiving side is formed in a substantially flat or planar manner.

According to the invention, it is preferred that the fastening screw, in an open state of the flange device, terminates substantially flush with a receiving side of the sawing device, while the fastening screw is drawn out of the sawing device by the nut in a closed. The open state preferably represents the starting point of the fastening and mounting method that was explained above in the text and, according to the invention, is preferably also referred to as "closing method". According to the invention, it is preferred that the protruding, front region of the fastening screw, in the closed state of the flange device, is received by the nut of the flange device, or enclosed by the inner region thereof. To this end, the fastening screw can in particular be screwed into the internal thread of the nut. As a result, a connection between the flange device and fastening screw of the sawing device is established, this serving to fasten the flange device to the sawing device. The saw blade can be fastened to the flange device using fastening means, such as screws, with which the saw blade can be screwed onto the flange device, in particular the flange body.

According to the invention, it is preferred that the movably configured nut of the flange device can be moved in the direction of the sawing device in the closed state, and in this state encloses the protruding region of the fastening screw. As a result of this movement in the direction of the saw, a cavity arises between the nut and the centering ring of the flange device, said cavity being filled by the nut in the open state of the flange device. According to the invention, it is preferred that this cavity coincides with the interior of the flange body, in which the nut can move according to the invention. The terms "forward" or "rearward" do not represent unclear terms for a person skilled in the art in the context of the present invention. The term "front" and the spatial direction "forward" preferably correspond, according to the invention, to the region of the sawing system in which, in the closed state, the flange device is arranged. The term "rear" and the spatial direction "rearward" correspond, according to the invention, to the region in which, for example, the head of the fastening screw is present. A "rearward" movement thus preferably takes place in the direction of the rear region of the fastening screw, while a "forward" movement preferably takes place in the direction of the flange device.

According to the invention, it is preferred that, in the open or closed state of the flange device, the nut terminates substantially flush with a top side and an underside of the flange body in the interior thereof. This preferably means according to the invention that a height of the nut corresponds substantially to the height of the flange body. Toward the outside, i.e. in the direction of the possible saw blade position, the nut is covered by the centering ring of the flange device. In other words, the centering ring of the flange device is designed to close off an interior of the flange body, which is preferably also referred to as cavity, toward the outside, such that the nut, in a preferred configuration of the invention, is not visible from the outside and is protected by the centering ring. According to the invention, it is preferred that the centering ring is designed to center the saw blade on the flange body of the flange device.

According to the invention, it is preferred that, in the open state of the flange device, the nut is arranged between the centering ring of the flange device and the receiving side of the sawing device, while, in the closed state, the nut has moved in the direction of the saw and encloses a cavity with the centering ring of the flange device. In other words, in the context of the present invention, it is preferred that the fastening screw of the saw and the nut of the flange device can be positioned with respect to one another in the open state such that they are not in contact with one another, while the nut encloses the fastening screw in the closed state and thus establishes a connection between the flange device and the saw. The enclosing is achieved in particular in that the fastening screw is screwed into the internal thread of the nut.

According to the invention, it is preferred that a first spring is arranged around the fastening screw in the sawing device, said first spring being designed to press the driver onto the nut of the flange device.

Preferably, the fastening screw is surrounded by a sleeve. Outside this sleeve, but surrounding the fastening screw, a first spring of the system can preferably be arranged. This first spring is preferably designed to press the driver onto the nut.

According to the invention, it is preferred that a second spring is present in the sawing device in the vicinity of the fastening screw, wherein the second spring is designed to press the fastening screw away from the flange device.

The spring force of the second spring is preferably used to move the fastening screw. In particular, the fastening screw can be moved counter to the second spring in the direction of the flange device, such that a front region of the fastening screw projects beyond the front side of the saw, wherein this protruding region of the fastening screw is received or enclosed by the nut of the flange device in the closed state of the flange device.

According to the invention, it is preferred that the second spring is arranged next to a sleeve which surrounds the drive spindle. This sleeve preferably has a side facing the flange device and a side facing the sawing device. These sides can preferably also be referred to as front and rear side of the sleeve. According to the invention, it is preferred that the second spring is arranged on the side of the sleeve facing the sawing device, wherein this side corresponds to the side of the sleeve that faces away from the flange device.

According to the invention, it is preferred that the first and the second spring have a restoring function and are designed to move the driver or the fastening screw into their respective starting positions.

According to the invention, it is preferred that the first spring is a stronger or harder spring than the second spring. In other words, the first spring can have a greater spring stiffness than the second spring. According to the invention, it may also be preferred for the spring stiffness of the first spring to be the same or substantially the same as the spring stiffness of the second spring.

According to the invention, it is preferred that the flange body of the flange device has a centering slot on an outer edge. According to the invention, it is preferred that the centering slot is in the form of an annular slot and that the annular slot cooperates with elements on the blade guard holder in order to achieve easier mounting of the saw blade and optimal pre-positioning. These elements of the blade guard holder can be for example web strips which are arranged on an inner side of holders for pre-centering. As an alternative to web strips, sleeves with a collar can be used, wherein the web strips or sleeves can be formed continuously or in an interrupted manner. The protruding regions of the web strips or sleeves can come into engagement with the annular slot and thus guide the annular slot. In this way, in particular pre-centering of the flange device can be effected.

According to the invention, it is preferred that the flange device is located between a saw arm of the sawing device and the saw blade when the flange device is used to fasten the saw blade to the sawing device. In this regard, in a further aspect, the invention also relates to the use of the flange device for fastening a saw blade to a sawing device, wherein the flange device is located between a saw arm of the sawing device and the saw blade during fastening.

Provision is made that the system has a flange device, and a sawing device and a central screwing device. The central screwing device can be in particular a screw, which can also be referred to as "fastening screw" according to the invention. The system can preferably be referred to as "sawing system".

According to the invention, it is preferred that the central screwing device of the system has a threadless lug for finding a threaded bore in a nut arranged in a movable manner in the flange device. As a result it is much easier to bring the nut and fastening screw together, this being particularly advantageous in particular at the significant weights that can occur in conjunction with a sawing device.

Preferably, the central screwing device can have a radial clearance in the drive spindle of the sawing device. According to the invention, it is preferred that a clearance width is in a range from 0.1 to 1 mm, preferably in a range from 0.3 to 0.8 mm, more preferably in a range from 0.4 to 0.6 mm, and is most preferably 0.5 mm. Through this choice of the clearance width, angular errors in the mounting or changing of the saw blade can be compensated in a particularly simple manner and corrected easily.

According to the invention, it is preferred that the central screwing device, or the fastening screw, is in the form of an expansion screw. In this way, undesired and safety-relevant loosening of the connection between the saw blade and flange device, or saw blade and sawing device, is effectively prevented.

According to the invention, it is preferred that a sealing point between the spindle and the central fastening screw becomes untight and water is seen to come out if the fastening screw undesirably detaches from the flange device. In this way, the user of the sawing device is quickly informed that the central screwing device may have come loose, and so this can rapidly be remedied.

In one possible configuration, the system may comprise a serrated shaft connection for centering the flange device. The serrated shaft connection allows in particular a connection and centering between the fastening screw in the spindle of the sawing device, the nut and the flange device.

According to the invention, it is preferred that the serrated shaft connection has a special introduction geometry which allows improved introduction of the nut into the spindle. In particular, the teeth of the serrated shaft connection engage better with one another as a result of the special guide. According to the invention, it is preferred that the serrated shaft connection has an internal geometry and an external geometry, wherein the external geometry is present on the nut and the internal geometry on the spindle. The special introduction geometry helps in the introduction of the nut into the spindle and effectively prevents tilting of the parts.

Furthermore, the serration allows particularly robust centering of the flange device and better force transmission compared with conventional flange devices. In particular, the flange manages without slotting, with the result that it is particularly stable and durable. A further advantage of the invention is that the centering and rotational entrainment take place in the flange, because this increases safety when starting operation of the sawing device.

According to the invention, it is preferred that the system has an adjustable blade guard holder. An advantage of the system is that, as a result of the blade guard holder, which is preferably configured in an adjustable manner, the saw blade can be caught. This is frequently not the case in conventional sawing systems as are known from the prior art. According to the invention, it is preferred that the blade guard holder can be fixed or locked in three different positions by means of a fixing pin. In particular, the blade guard holder can be adjusted through −45 degrees, 0 degrees or +45 degrees in relation to the saw arm. In an unlocked state, adjustment of the blade guard holder through 360 degrees is possible.

In a further possible embodiment of the invention, the system can have a water guide, which extends substantially centrally through the drive spindle of the sawing device. In a rear region of the fastening screw, the fastening screw is surrounded by an annular disk, wherein the disk is fastened between the fastening screw and drive spindle. According to the invention, it is preferred that the disk comprises cutouts in its circumference, wherein the water required for the water guide can flow, inter alia, through these cutouts in the disk in order to pass into the region of the saw blade.

In conventional sawing systems that are known from the prior art, the feed for the liquid for cooling the saw blade frequently extends through the blade guard holder of the sawing device. By means of the novel water guide of the system, which extends substantially centrally through the drive spindle of the sawing device, the coolant, which is preferably cooling water, optionally with additives, can advantageously also be used to rinse and thus clean the surrounding components of the system. According to the invention, it is particularly preferred that the teeth of the serrated shaft connection can be rinsed with the liquid that can be provided by the water guide, and in this way they can be kept particularly clean. Tests have shown that the interface between the saw blade and saw can be cleaned substantially continuously, in particular during operation of the saw, by the water feed extending within the spindle.

The invention manages in particular without losable parts and is particularly easy to maintain and service. In particular, there is no regreasing, as is conventional in some flange devices that are known from the prior art.

BRIEF DESCRIPTION OF THE DRAWINGS

Further advantages of the invention will become apparent from the following description of the figures. Exemplary embodiments of the present invention are illustrated in the figures. The figures, the description and the claims contain numerous features in combination. A person skilled in the art will expediently also consider the features individually and combine them to form useful further combinations.

In the figures, identical and similar components are denoted by the same reference signs. In the figures.

DETAILED DESCRIPTION

Figure 1:
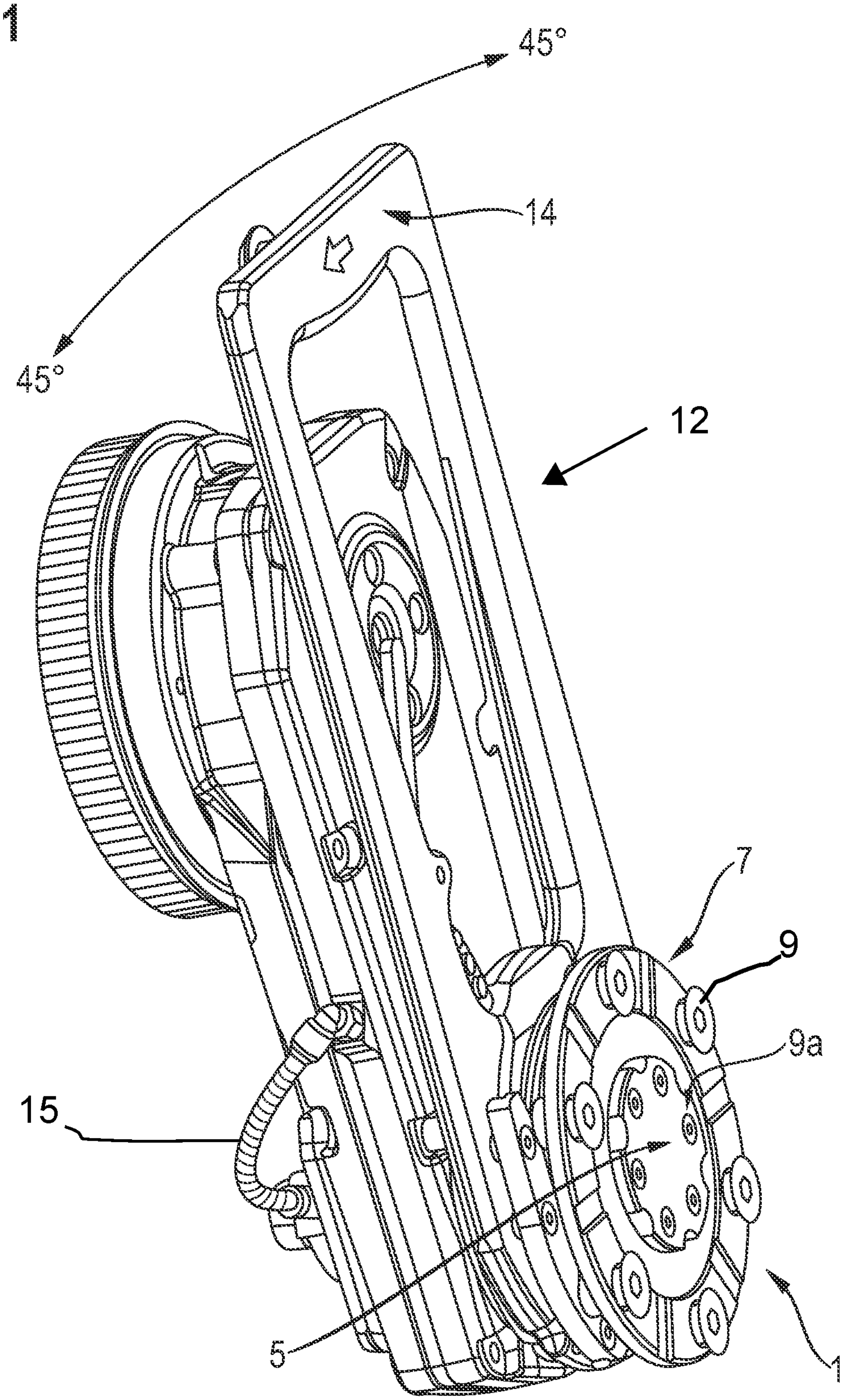
FIG. 1 shows a view of a preferred embodiment of the flange device
Figure 2:
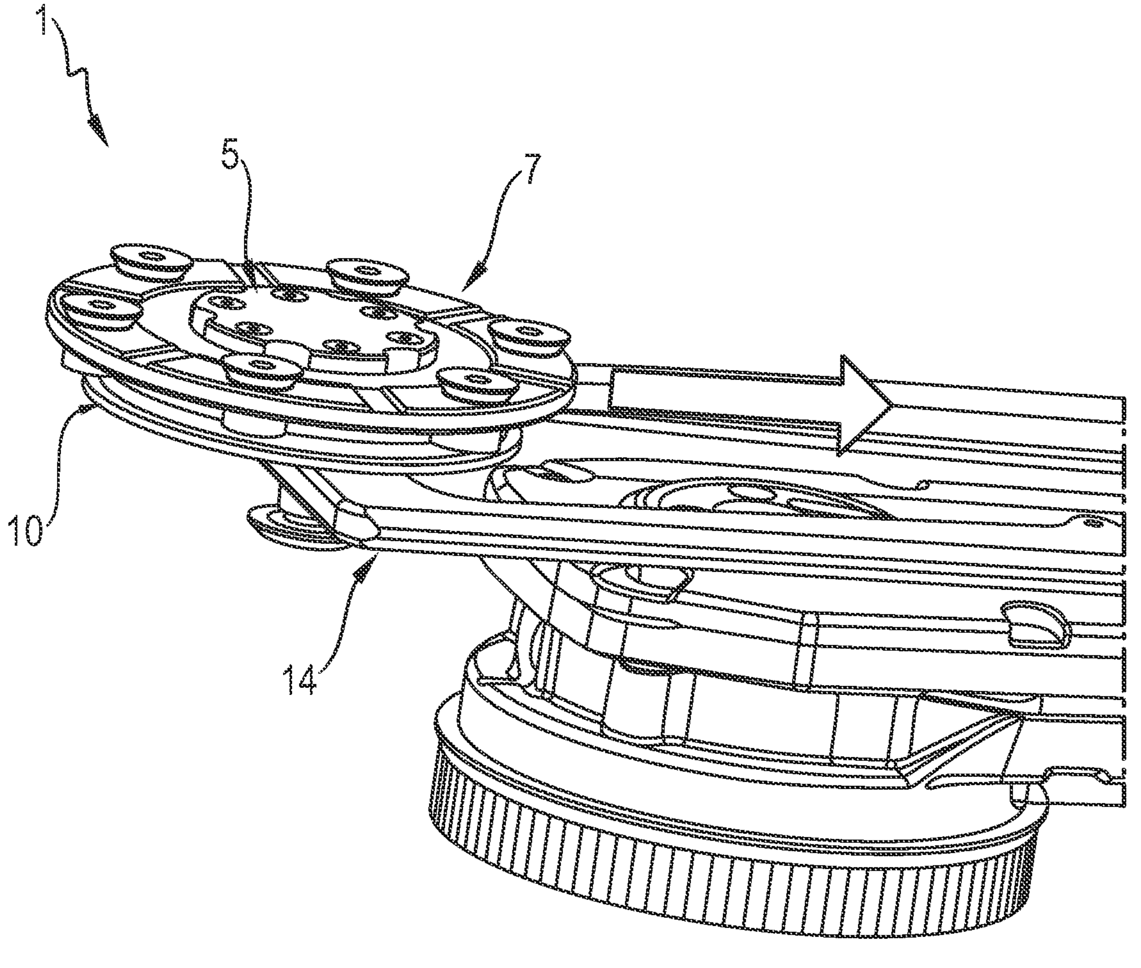
FIG. 2 shows a view of a preferred embodiment of the flange device
Figure 3:
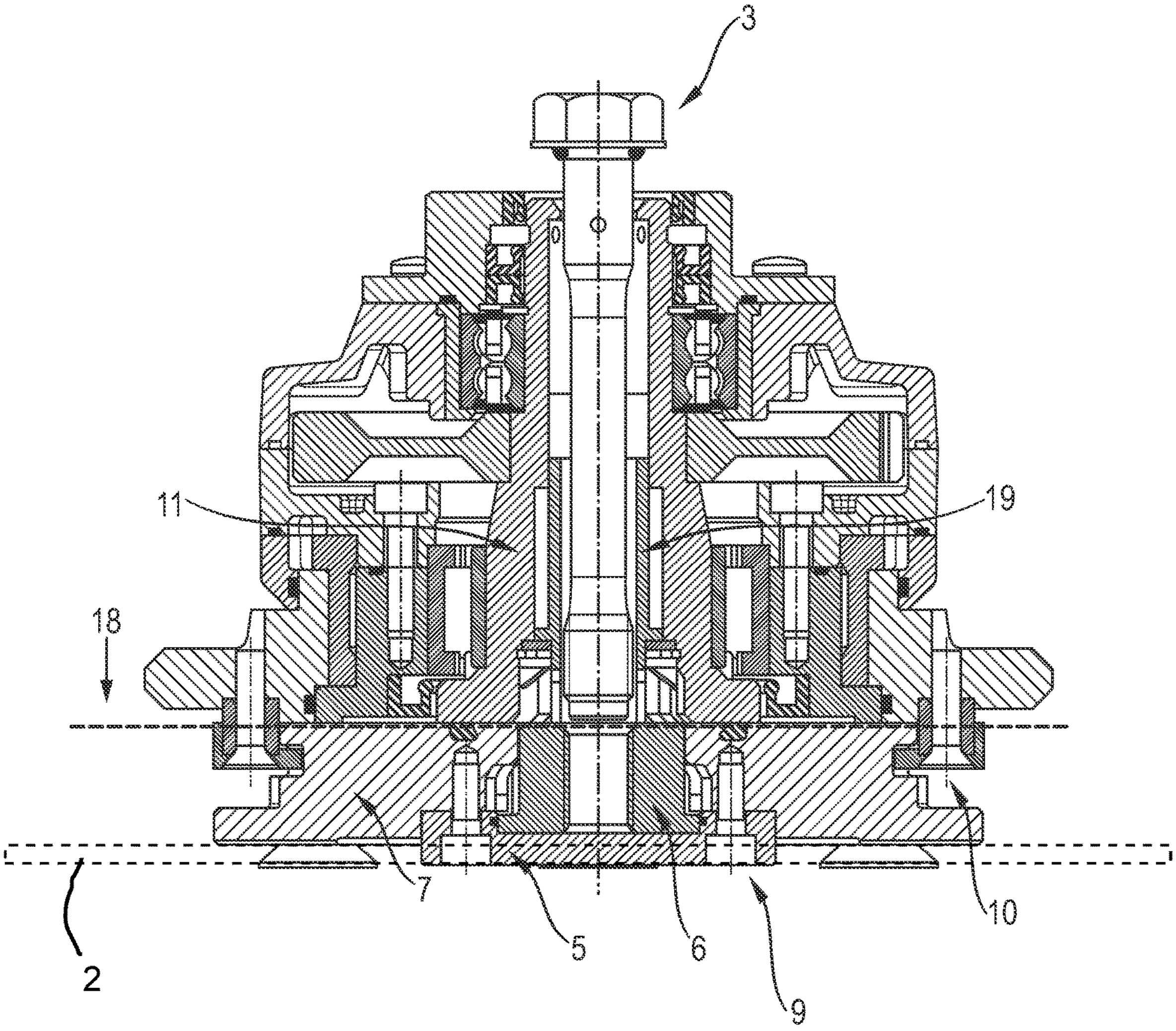
FIGS. 3, 4, 5 and 6: show views of a preferred embodiment of the flush-cut flange in an open state
Figure 4:
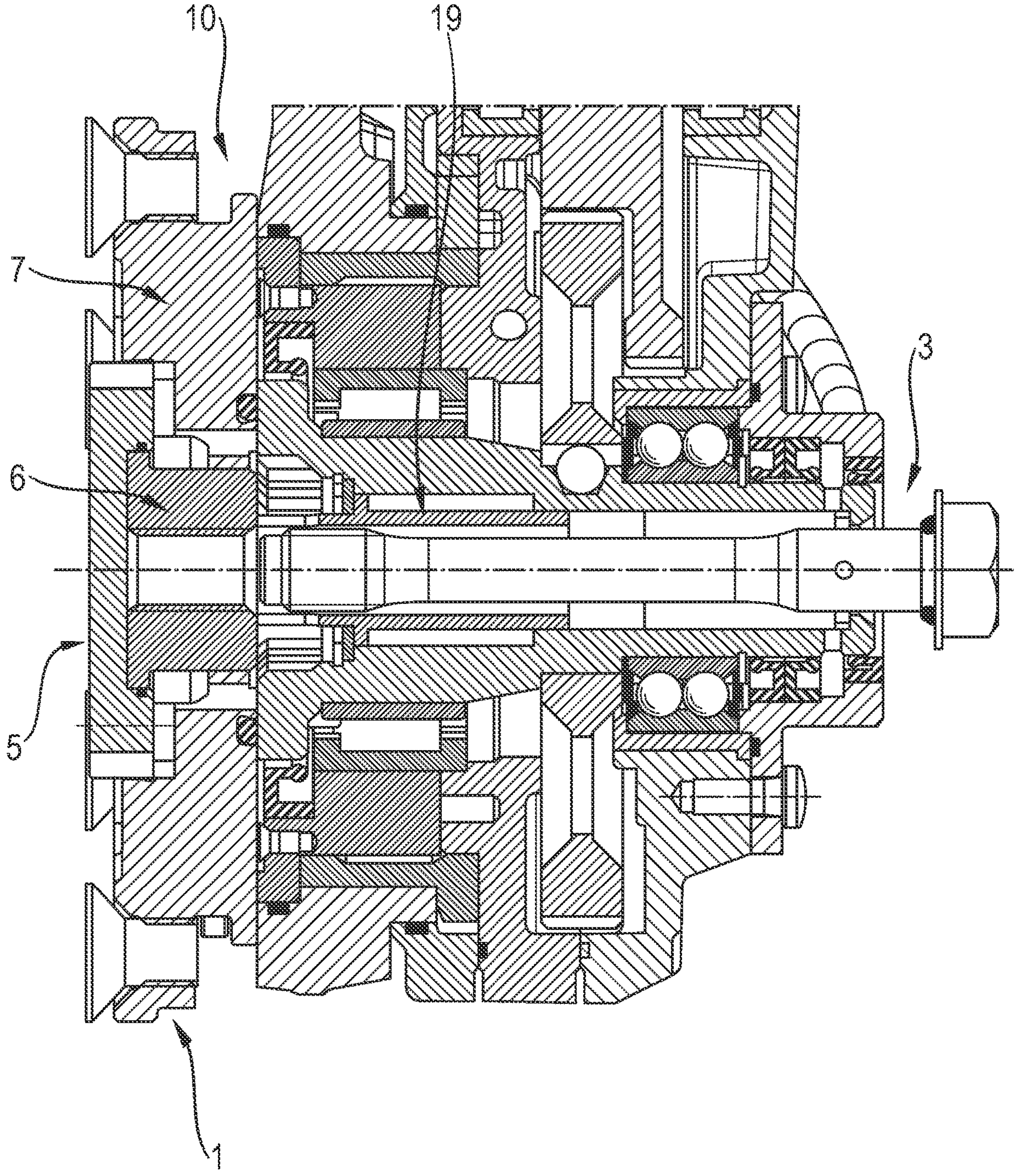
Figure 5:
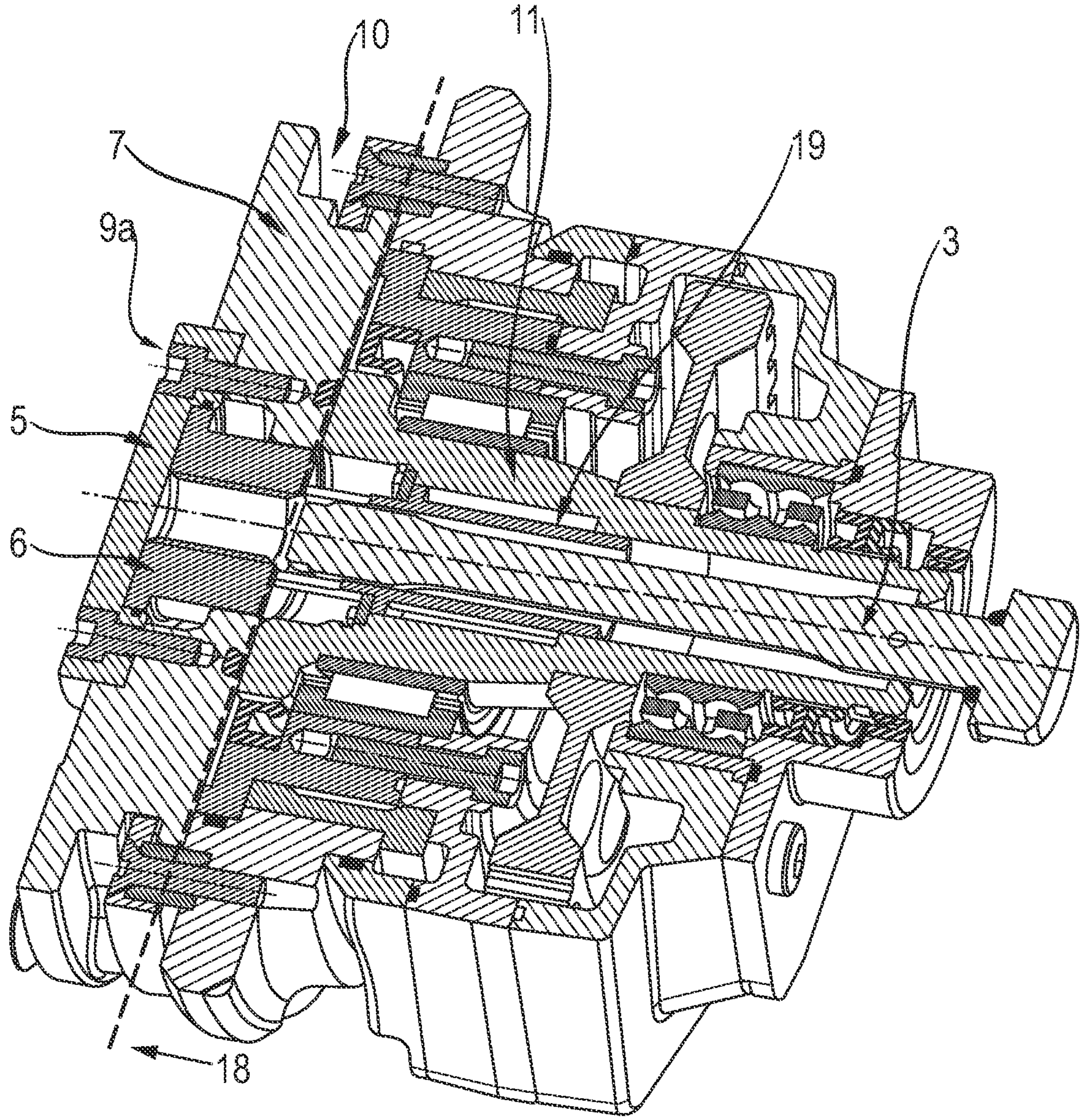

FIGS. 1 and 2 show views of a preferred embodiment of the flange device 1. In particular, the flange body 7 and the centering ring 5 are apparent in FIGS. 1 and 2, wherein the centering ring 5 covers a cavity 8 in which the nut 6 of the flange device 1 can be arranged (open state of the flange device 1). FIG. 2 illustrates the flange device 1 from the side, such that the centering slot 10 can be seen, which extends around the circumference of the flange body 7. In particular, FIGS. 1 and 2 show a blade guard holder 14, which can preferably be adjusted in an angular range of 90 degrees, or 90°.

FIGS. 3 to 6 show views of a preferred embodiment of the flush-cut flange 1 in an open state. They illustrate the flange body 7, which can be fastened to a receiving side 18 (see, e.g, FIGS. 3 and 5) of the sawing device 4. A connection between the flange body 7 and centering ring 5 is established by fastening means 9*a*, with 9 indicating connectors for the saw blade. The centering ring 5 covers a cavity 8 (see, e.g., FIG. 9) in which the nut 6 is located in the open state of the flange device 1. In the sawing device 4, a fastening screw 3 is located in the interior of the drive spindle 11, said screw being able to rotate about an axis of rotation 21 (see, e.g, FIG. 7). The fastening screw 3 is surrounded in a central region by a sleeve 19. Arranged in the region of the sleeve 19 are springs 16, 17 (see, e.g, FIG. 12*d*), wherein a second spring 17 is designed to press the saw blade 2 (shown solely schematically in FIG. 3) onto a substrate to be worked, while the first spring 16 is designed to press the fastening screw 3 in the direction of the flange device 1.

In the open state, the fastening screw 3 is retracted in the sawing device 4, while the nut 6 of the flange device 1 is arranged in the cavity 8 in the interior of the flange body 7. According to the invention, it is particularly preferred that the nut 6 of the flange device 1 is configured in a movable manner, while the drive spindle 11 is arranged rigidly in the saw arm 12 of the saw 4 (see, e.g., FIG. 1).

FIGS. 7 to 10 show views of a preferred embodiment of the flush-cut flange 1 in a closed state. In this state, the fastening screw 3 is pressed by the first spring 16 in the direction of the flange device 1 such that the front region of the fastening screw 3 is present in an interior of the nut 6. In other words, the nut 6 surrounds this front region of the fastening screw 3 in order to establish a connection between the saw 4 and the flange 1. In this case, the nut 6 also moves in the direction of the saw, such that, in the flange device 1, a cavity 8 arises beneath the centering ring 5 of the flange device 1 (see, e.g., FIG. 9).

Figure 6:
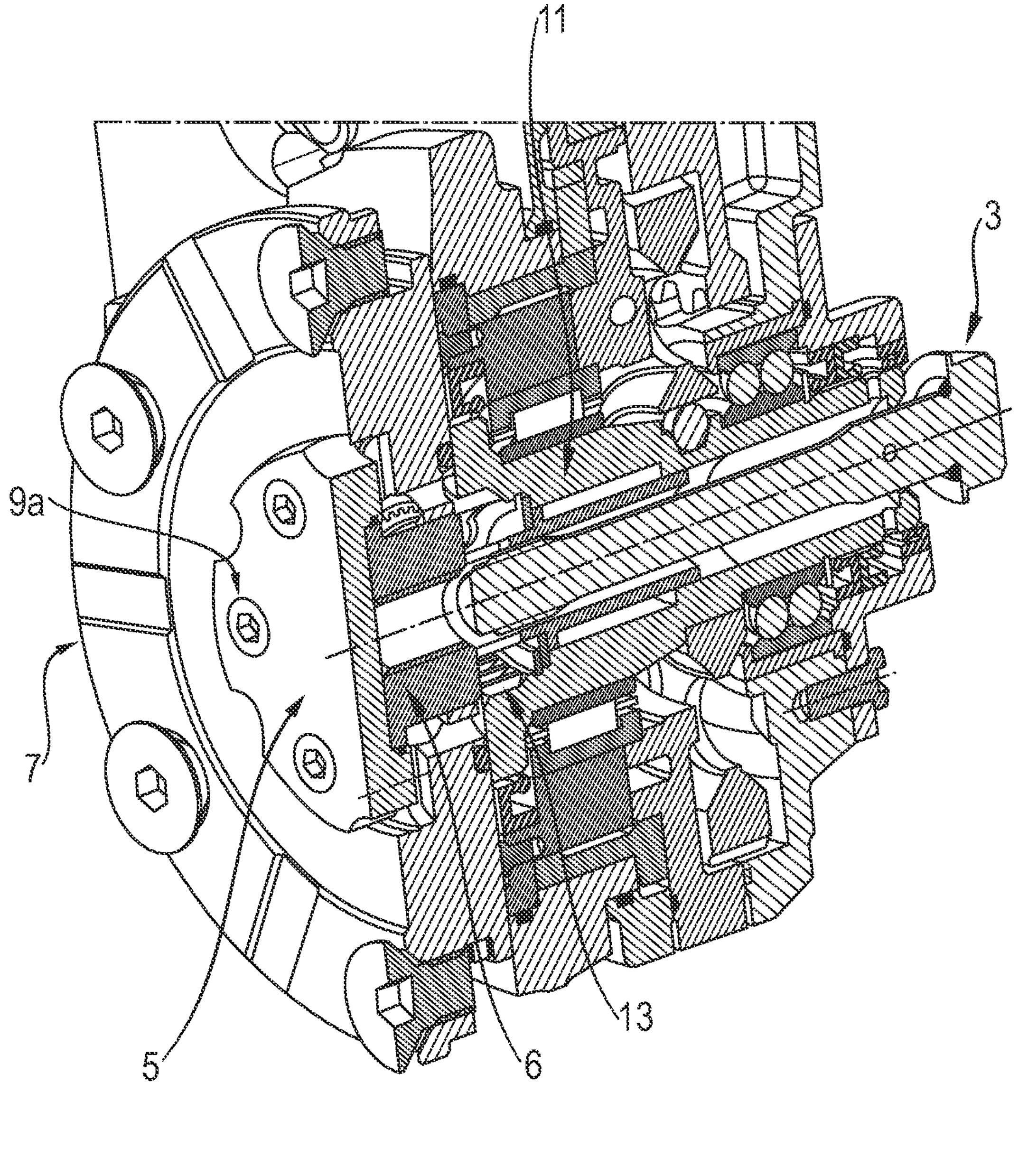
Figure 7:
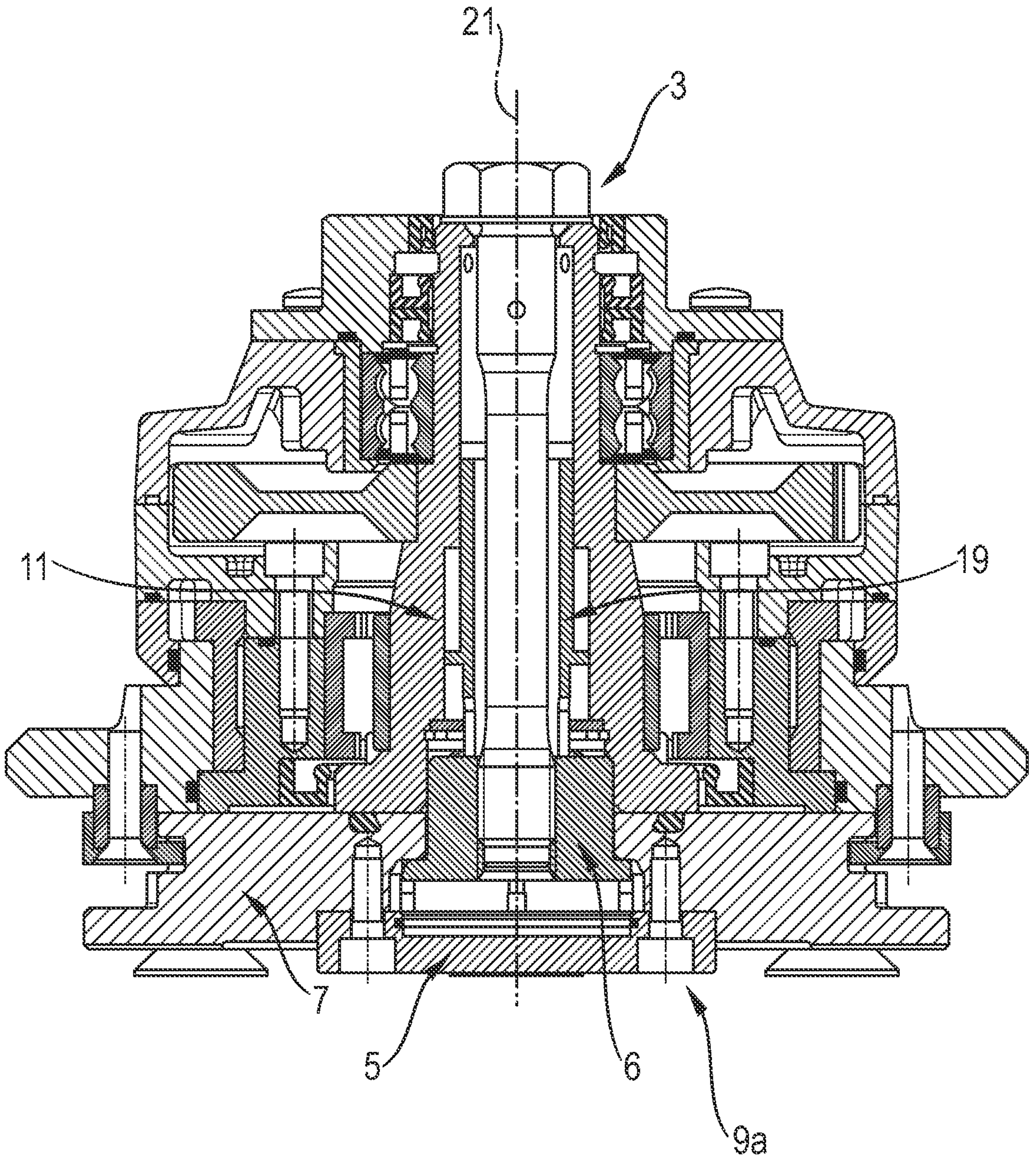
FIGS. 7, 8, 9 and 10: show views of a preferred embodiment of the flush-cut flange in a closed state
Figure 8:
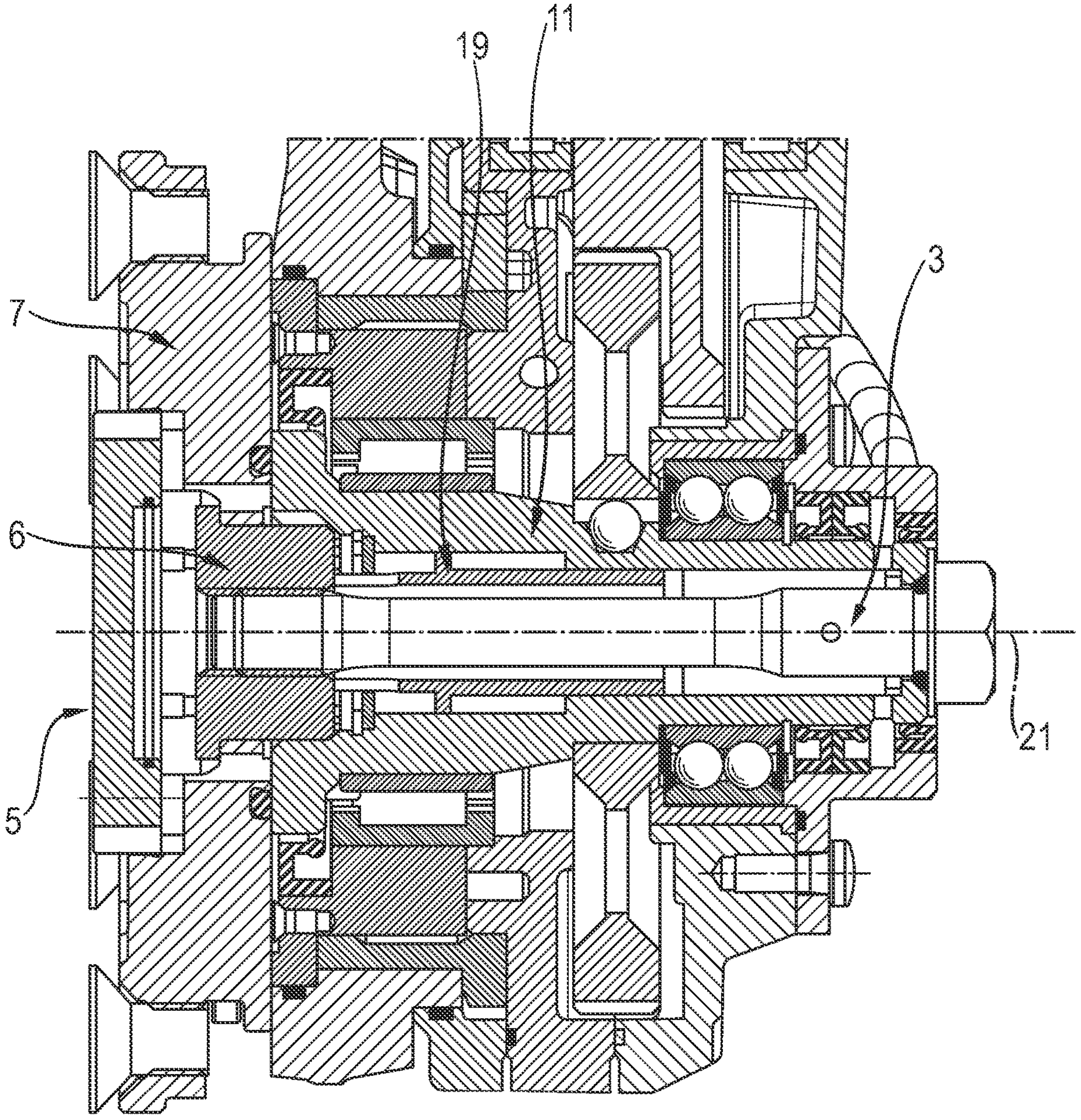
Figure 9:
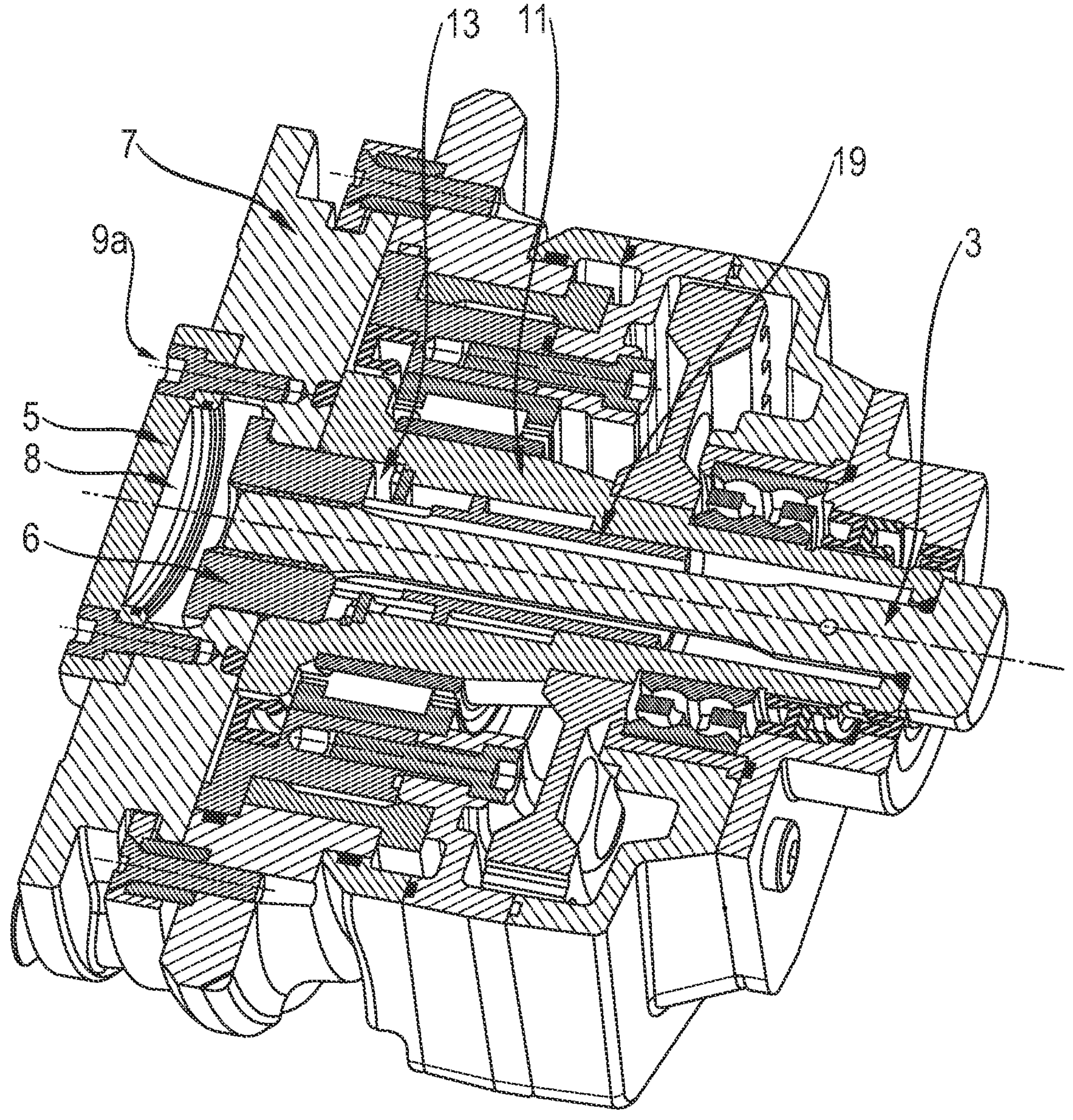
Figure 10:
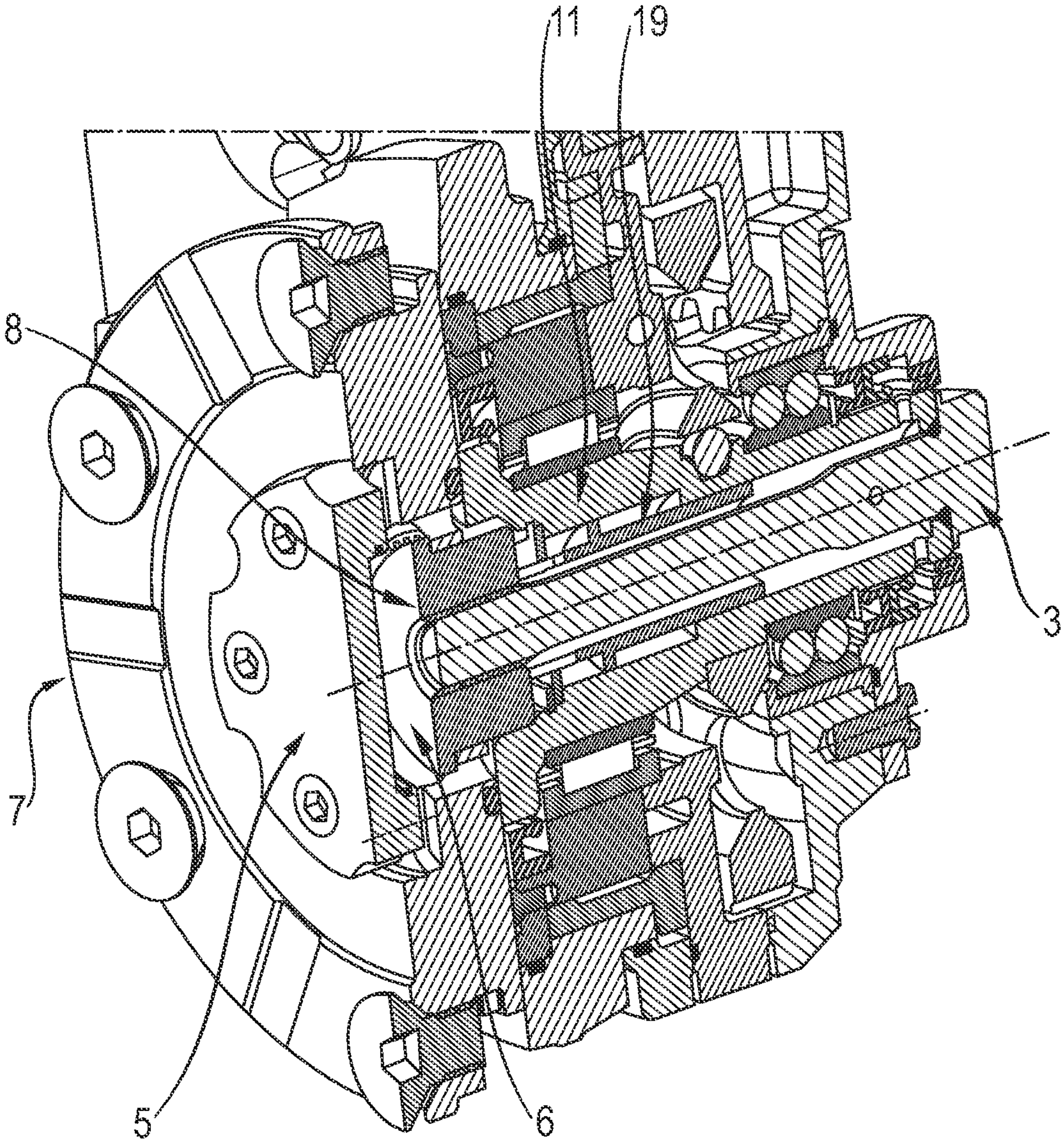

In FIGS. 6 and 9, the serrated shaft connection 13 between the nut 6 and the spindle 11 is illustrated. The nut 6 has an external geometry of the serrated shaft connection 13, while the drive spindle 11 has an internal geometry of the serrated shaft connection 13. When the flange 1 is being fastened to the saw 4, the external geometry and the internal geometry can come into engagement with one another, such that a torque can be transmitted from the spindle 11 to the flange 1, or to the saw blade 2.

Figure 11A:
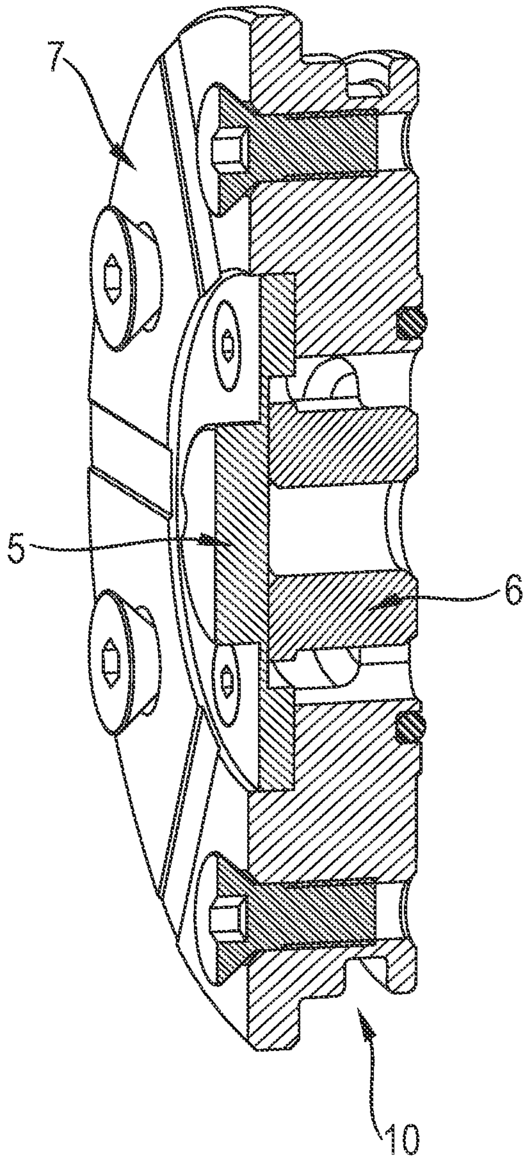
FIGS. 11*s* and 11*b* show various preferred embodiments of the flush-cut flange
Figure 11B:
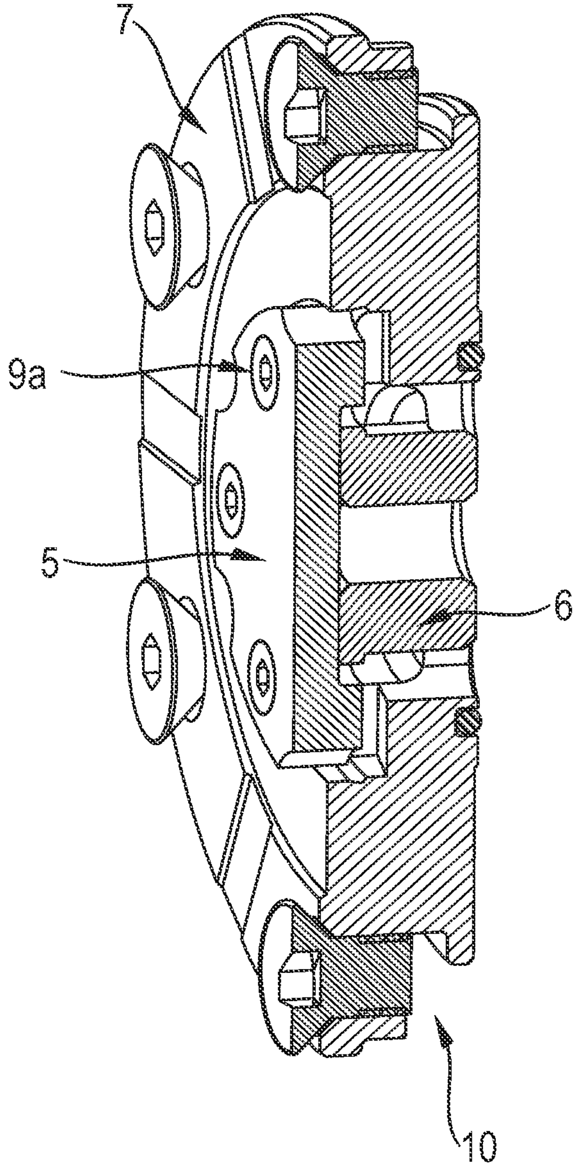

FIGS. 11 and 11*b* show various possible configurations of the flange device 1.

Figure 12D:
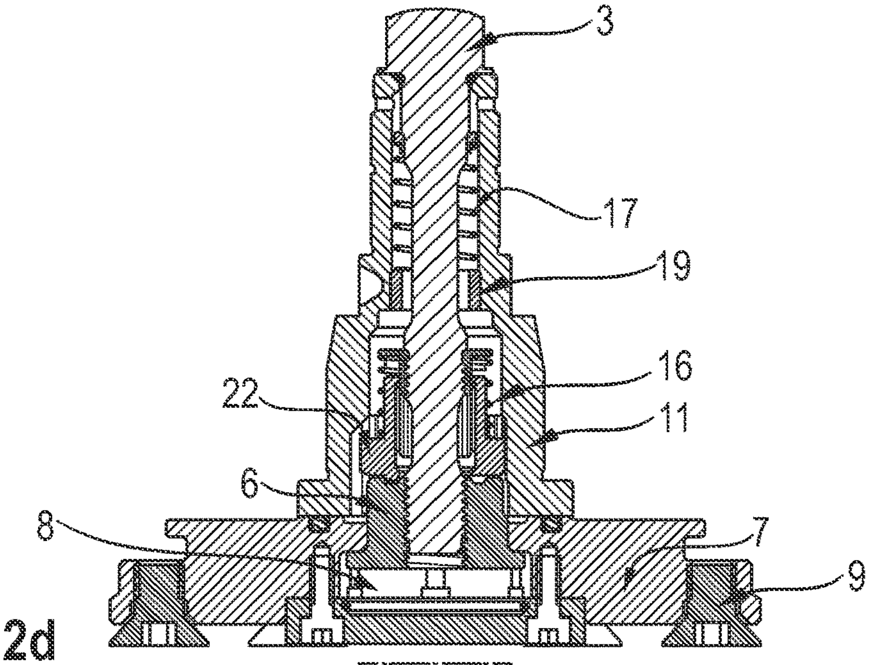
FIGS. 12*a*, 12*b*, 12*c*, 12*d* show a sequence of a preferred embodiment of the fastening method
Figure 12C:
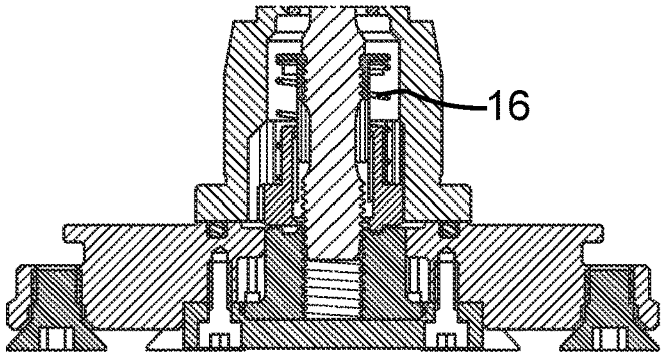
Figure 12B:
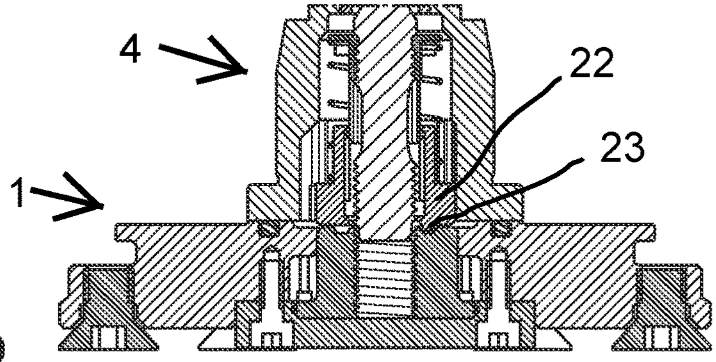
Figure 12A:
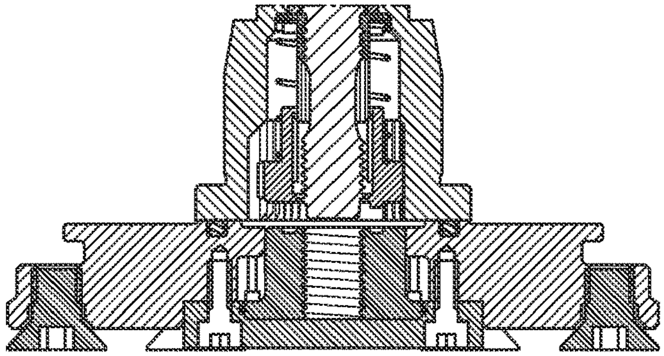

FIGS. 12*a* to 12*d* show a sequence of the method for fastening a saw blade 2 to a sawing device 4. This fastening preferably takes place using a flange device 1 according to the present invention. FIGS. 12*a* to 12*d* should be read from bottom to top, wherein the bottommost FIG. 12*a* shows the sawing device 4 with a drive spindle 11, the fastening screw 3 and the flange device 1 as are provided according to method steps a)-c) of the present method. According to the invention, it is preferred that, in an open state, which is the starting point for the fastening method, a nut 6 of the flange device 1 is received substantially entirely in an interior 8 of a flange body 7 of the flange device 1 and the central screwing device 3 is arranged substantially entirely inside the drive spindle 11. The "open state" describes the state of the sawing system 20 in which the flange device 1 and saw 4 are initially separated from one another and can be brought into the vicinity of one another in order to fasten the flange 1 to the saw 4. In this regard, the open state is considered to be the starting point for the present fastening method.

In FIG. 12*b*, the introduction of the central screwing device 3 into an internal thread of the nut 6 is illustrated, wherein, as a result, a driver 22 of the sawing device 4 comes into engagement with the nut 6 of the flange device 1. Preferably, the driver 22 can comprise cams 23 that engage in pockets in the nut 6 of the flange device 1. The cams 23 are preferably present on an end face of the driver 22, which is opposite the rear side of the nut 6, in which the pockets are preferably present.

FIG. 12*c* shows the continued screwing of the fastening screw 3 into the internal thread of the nut 6 of the flange device 1. According to the invention, it is preferred that a sleeve 19 of the saw 4 is introduced into a gap between the driver 22 and the central screwing device 3 and a first spring 16 is compressed.

FIG. 12*d* shows the continued screwing of the central screwing device 3 into the internal thread of the nut 6, with the result that the nut 6 of the flange device 1 is drawn onto the fastening screw 3. According to the invention, it is preferred that the nut 6 is drawn out of the interior of the flange body 7 of the flange device 1 until a closed state or fastened state is established in that a stop is reached and an external thread of the central screwing device 3 has been received substantially entirely in the nut 6 of the flange device 1.

Figure 13:
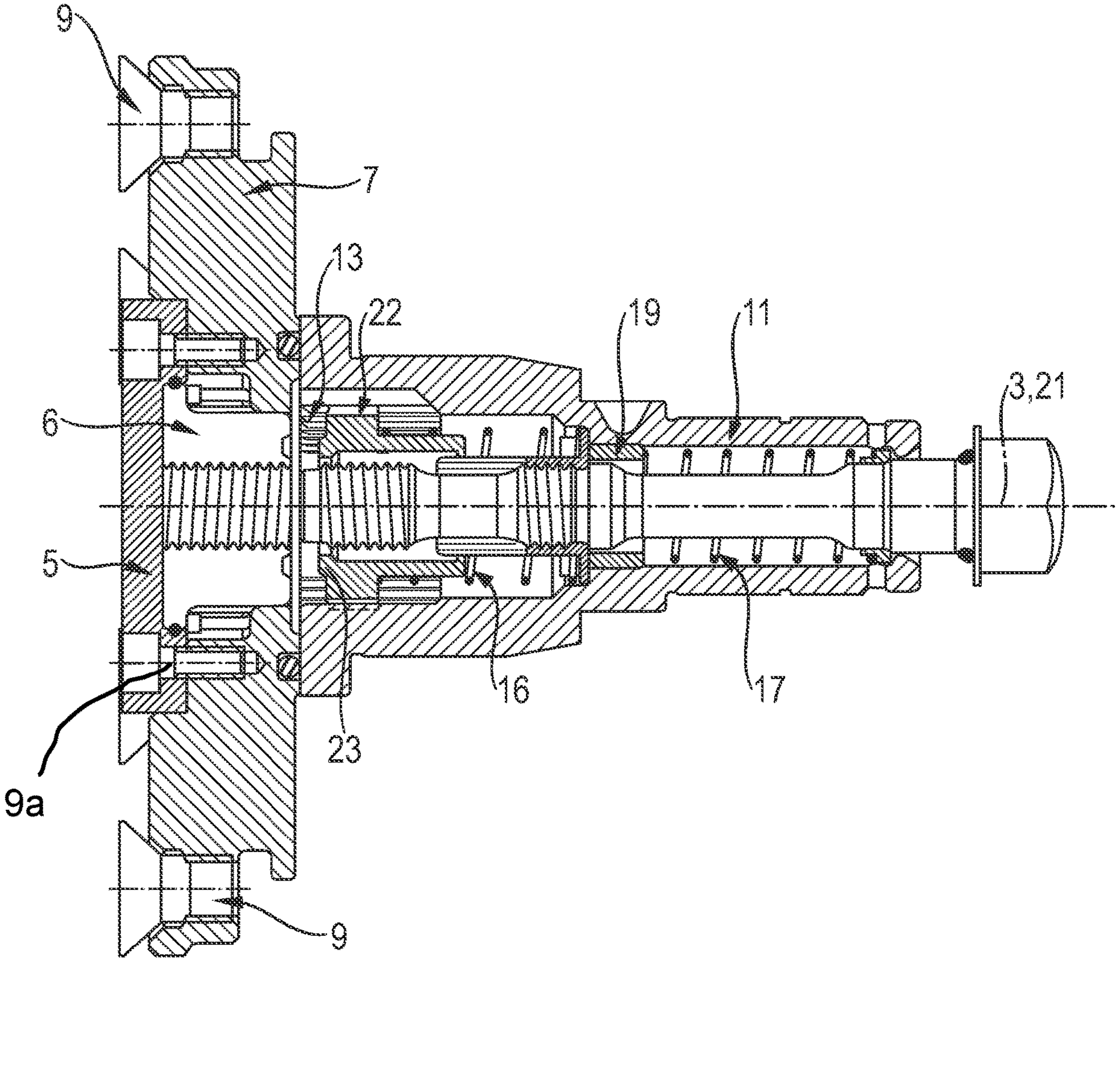
FIG. 13 shows a further preferred embodiment of the flush-cut flange

FIG. 13 shows a preferred embodiment of the flush-cut flange 1, wherein the flange device 1 is arranged in the immediate vicinity of the sawing device 4. The fastening screw 3 has been drawn back as far as it can; the nut 6 of the flange device 1 is located substantially entirely in the interior of the flange 1 or of the flange body 7. This state is considered to be the open state or starting point of the present fastening method. As a result of the fastening screw 3 being screwed into the nut 6 of the flange device 1, the flange 1 can be fastened to the saw 4.

The sawing device 4 comprises a drive spindle 11, which surrounds a sleeve 19 and springs (16, 17), and a driver 22 with cams 23. The drive spindle 11 can rotate about an axis of rotation 21 that extends centrally through the fastening screw 3. The saw blade 2 (illustrated solely schematically in FIG. 3) can be fastened to the flange device 1 by fastening screws 9, wherein other fastening means 9*a* are provided in order to establish a connection between a centering ring 5 and the flange body 7 of the flange 1.

LIST OF REFERENCE SIGNS

1 Flange device
2 Saw blade
3 Central screwing device
4 Sawing device
5 Centering ring
6 Nut
7 Flange body
8 Interior of the flange body, cavity
9, 9*a* Fastening means
10 Centering slot
11 Drive spindle
12 Saw arm
13 Serrated shaft connection
14 Blade guard holder
15 Water guide
16 First spring
17 Second spring
18 Receiving side
19 Sleeve
20 System
21 Axis of rotation
22 Driver
23 Cam

What is claimed is:

1. A flange device for fastening a saw blade to a drive spindle of a sawing device, the flange device comprising:

a centering ring;

a nut; and a flange body having a first side for contact with the saw blade and an opposite second side for contact with the sawing device and having a cavity, the nut being arranged movably in the cavity, the centering ring being fastened to the flange body on the first side by at least one fastener, and, in a closed state of the flange device, the nut is movable to extend outwardly from the second side for the purpose of fastening the flange device to the sawing device.

2. The flange device as recited in claim 1 wherein in an open state of the flange device, the nut terminates in a flush manner with the second side side.

3. The flange device as recited in claim 1 wherein the flange body has a centering slot on an outer edge.

4. The flange device as recited in claim 1 wherein the nut has an internal thread for connection via a central screwing device to the drive spindle.

5. The flange device as recited in claim 1 wherein the centering ring covers the cavity on the first side and extends outwardly past the first side.

6. A system for fastening a saw blade to a drive spindle of a sawing device, the system comprising: the flange device as recited in claim 1, and the sawing device and a central screwing device for pulling the nut from the open state to the closed state.

7. The system as recited in claim 6 wherein the central screwing device has a threadless lug for finding a threaded bore in the nut.

8. The system as recited in claim 6 wherein the central screwing device has a radial clearance in the drive spindle of the sawing device.

9. The system as recited in claim 8 wherein the radial clearance has a clearance width in a range from 0.1 to 1 mm.

10. The system as recited in claim 9 wherein the radial clearance has a clearance width in a range from 0.3 to 0.8 mm.

11. The system as recited in claim 10 wherein the radial clearance has a clearance width in a range from 0.4 to 0.6 mm.

12. The system as recited in claim 10 wherein the radial clearance has a clearance width of 0.5 mm.

13. The system as recited in claim 6 wherein the central screwing device is in the form of an expansion screw.

14. The system as recited in claim 6 further comprising a serrated shaft connection for centering the flange device.

15. The system as recited in claim 6 further comprising an adjustable blade guard holder.

16. The system as recited in claim 6 further comprising a water guide extending centrally through the drive spindle of the sawing device.

17. The system as recited in claim 6 further comprising a first spring arranged around the central screwing device, the first spring being designed to press the saw blade onto a substrate to be worked.

18. The system as recited in claim 17 further comprising a second spring in the vicinity of the central screwing device, wherein the second spring is designed to press the drive spindle in the direction of the flange device.

19. The system as recited in claim 6 further comprising a spring in the vicinity of the central screwing device, wherein the spring is designed to press the drive spindle in the direction of the flange device.

20. A method for fastening a saw blade to a drive spindle of a sawing device, the method comprising the following steps:

a) providing a sawing device having a drive spindle, b) providing a central screwing device, c) providing the flange device as recited in claim 1, wherein, in the open state, the nut of the flange device is received entirely in the cavity of the flange body of the flange device and the central screwing device is arranged entirely inside the drive spindle, d) introducing the central screwing device into an internal thread of the nut, with the result that a driver comes into engagement with the nut of the flange device, e) continuing to screw the central screwing device into the internal thread of the nut, and f) continuing to screw the central screwing device into the internal thread of the nut, with the result that the nut of the flange device is drawn onto the central screwing device.

* * * * *